United States Patent [19]

Mariani

[11] 4,363,638
[45] Dec. 14, 1982

[54] BIOMASS GAS PRODUCER

[76] Inventor: Eliseo O. Mariani, 3900 Mt. Vernon Ave., P.O. Box 5084, Alexandria, Va. 22305

[21] Appl. No.: 256,549

[22] Filed: Apr. 22, 1981

[51] Int. Cl.$^3$ .............................................. C10J 3/44
[52] U.S. Cl. .................................... 48/111; 48/118.5; 202/83; 202/218
[58] Field of Search .............. 48/111, 122, 123, 118.5, 48/87; 123/3; 202/218, 238, 118, 83; 110/255

[56] References Cited

U.S. PATENT DOCUMENTS

| | | | |
|---|---|---|---|
| 835,747 | 11/1906 | Brown | 202/128 |
| 894,877 | 8/1908 | Crowell . | |
| 1,954,208 | 4/1934 | Imbert | 123/3 |
| 2,021,055 | 11/1935 | Falconer et al. | 48/118.5 |
| 3,148,128 | 9/1964 | Fagnant | 202/129 |
| 3,771,263 | 11/1973 | Borggreen et al. | 48/209 |
| 4,062,304 | 12/1977 | Herbold et al. | 202/218 |

OTHER PUBLICATIONS

*Energy Report No. 1,* Apr., 1980, University of Florida, Gainesville, "How to Power a Gasoline Engine with Wood", By K. M. Eoff and D. M. Post.
Pillard Energy Recovery from Vegetable Wastes, May 1979, Pillard, Entr. E.G.C.I., Marseille, France.
*Symposium Papers*—Energy from Biomass and Wastes, Washington, D.C., Aug. 14–18, 1978, Sponsored by Institute of Gas Technology, pp. 729–748 (731).

*Primary Examiner*—William F. Smith
*Attorney, Agent, or Firm*—Wilkinson, Mawhinney & Theibault

[57] ABSTRACT

The present disclosure is directed to a biomass gas producer having a tiltable gassifier in which the gassifier for performing endothermic chemical reactions of solid material having combustible gas forming and liquifiable constituents has a top charging end and an ash discharge end. A platform support means is provided for the gassifier. An adjustable support means is carried by the platform for supporting the gassifier for tilting from a substantially vertical endothermic reaction or firing mode to a low height inclined charging mode for introducing the material to be fired. A tilt means is connected to the adjustable support means to incrementally tilt the major axis of the gassifier between a firing mode position and a loading and waste discharge mode position. The gassifier also has means for directing the burnable gas produced therein to operate a prime mover for example a boiler, internal combustion equipment or turbine to drive power take off shafts to perform useful mechanical tasks.

1 Claim, 7 Drawing Figures 4,363,638

BIOMASS GAS PRODUCER

TECHNICAL FIELD

My invention relates to gas producing apparatus of the gassifier type in which various fuels such as wood, wood waste, cellulose waste from agricultural products in ordinary dry condition may be burned to liberate combustible gas which may be employed to power prime mover equipment which through a power take offs can be used as a prime mover for many mechanical drive tasks.

BACKGROUND ART

Heretofore many forms of apparatus have been devised as gas producers which burn wood, wood products, cellulose waste, garbage and other waste from agriculture products. The closest art known to me prior to this application are the patent to:

P. Brown U.S. Pat. No. 835,747
M. E. Crowell U.S. Pat. No. 894,877
J. P. Imbert U.S. Pat. No. 1,954,208
R. Falconer et al. U.S. Pat. No. 2,021,055
J. A. Fagnant U.S. Pat. No. 3,148,128
Borggreen et al. U.S. Pat. No. 3,771,263
Energy Report No. 1, April, 1980, University of Florida, Gainesville, "How to Power A Gasoline Engine with Wood" by K. M. Eoff and D. M. Post
Pillard Energy Recovery From Vegetable Wastes, May 1979 Pillard Entr. E.G.C.I., Marseille, France
Symposium Papers—Energy from Biomass and Wastes, Washington, D.C. Aug. 14–18, 1978, Sponsered by Institute of Gas Technology, Pages 729 through 748 (731)

DISCLOSURE OF THE INVENTION

In accordance with my invention I provide a gassifier type gas producer for producing gas to fuel a prime mover such as a boiler, internal combustion engine, turbine etc. which is compact, lightweight, portable, small enough for road transport under bridges and which does not require tall charging conveyors to deliver the fuel to the gassifier for firing, in fact my apparatus is of the tiltable manually chargable type which can be readily tilted between a substantially erect firing position (firing mode) and a tilted charging position (charging mode) in which a human being may introduce the fuel without the necessity of conveyors etc.

BEST MODE FOR CARRYING OUT THE INVENTION

Figure 1:
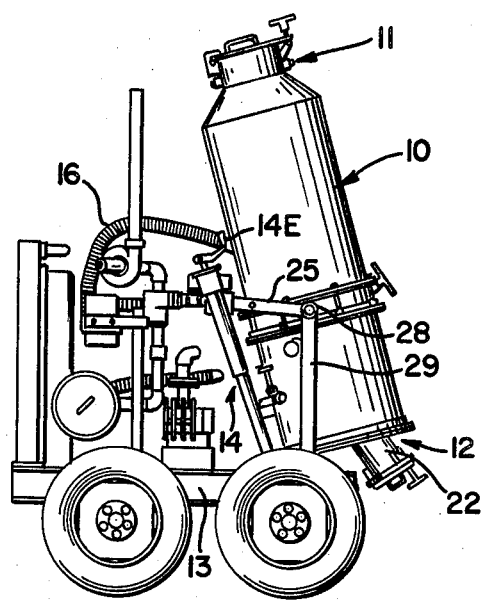
FIG. 1 is a side elevational view of one form of gassifier of my invention in its firing mode.

Referring now to FIGS. 1 through 4, the biomass gas producer of the present invention comprises a gassifier 10 for performing endothermic chemical reactions of solid material having a fuel charging opening 11 and an ash discharge end 12. The gassifier 10 is mounted on a platform support 13 which may be either stationary or mobile. An adjustable support 14 is carried by the platform 13 which pivotally rocks the gassifier 10 on each side for tilting movement from a substantially vertical endothermic reaction mode, FIG. 1, to a low height inclined charging mode, FIG. 3, for introducing the material to be fired.

Figure 3:
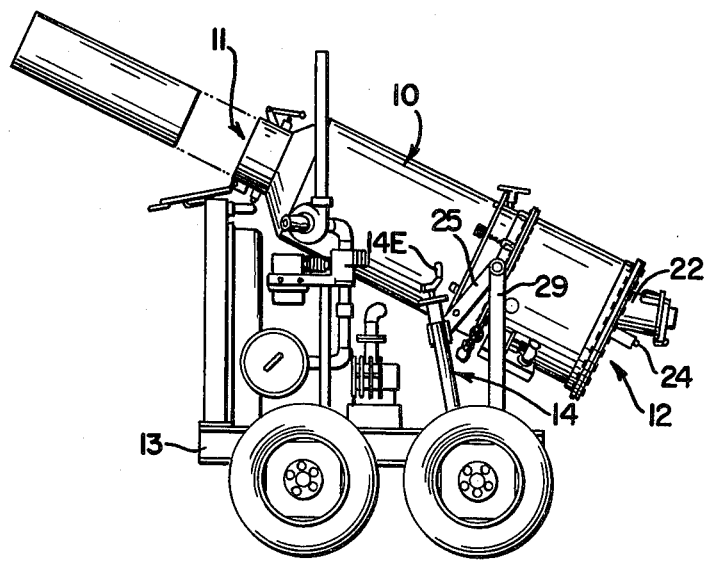
FIG. 3 is a side elevational view of the apparatus of FIG. 1 in its tilted or charging mode.

The adjustable support 14 has an extensible drive connection, FIGS. 1 and 5 through 7, to incrementally tilt the major axis of the gassifier 10 between a firing mode and waste discharge mode (FIG. 1) and a loading mode, FIG. 3. The gassifier has a flexible hose connection 16 for directing the burnable gas produced by the gassifier to operate a gas fired prime mover such as a boiler, internal combustion engine or turbine to convert the gas thermal energy to working mechanical energy.

Figure 4:
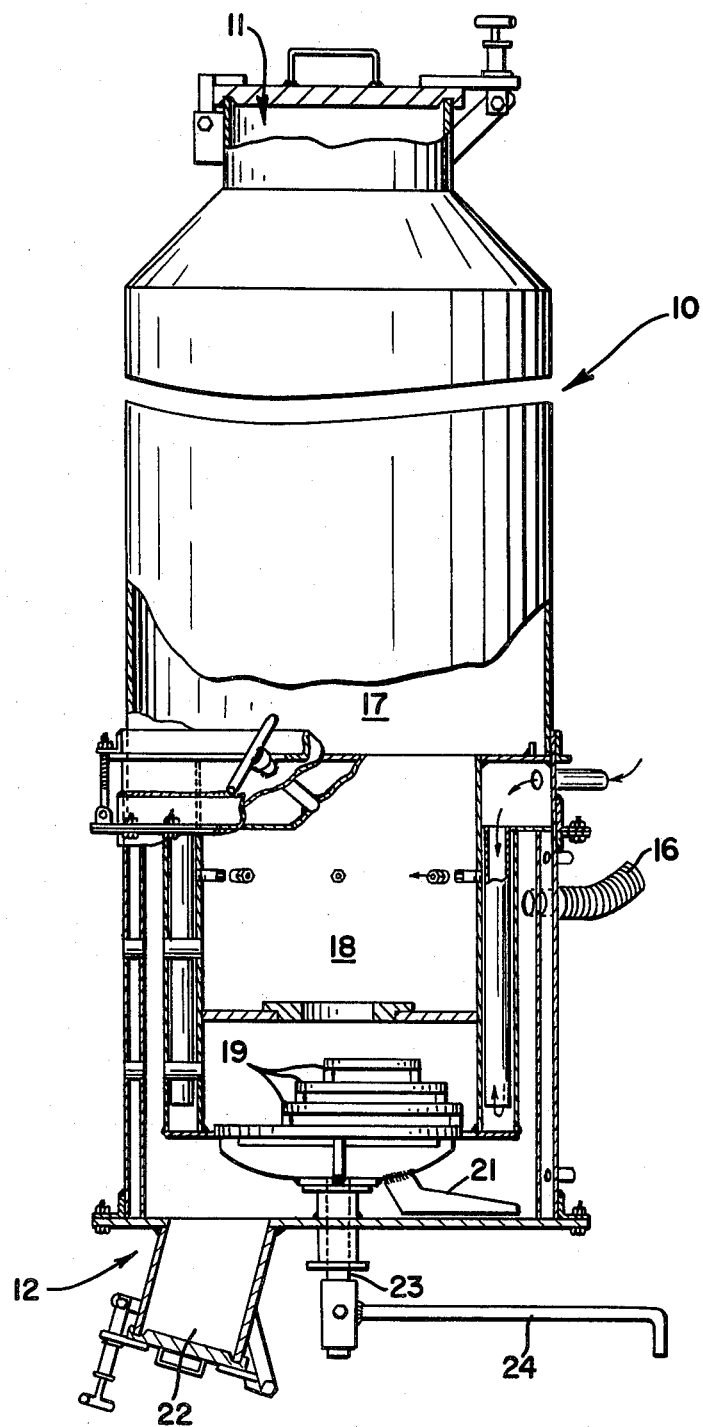
FIG. 4 is an end elevational view with parts broken away and parts shown in section of one form of gassifier forming part of my invention.

Referring now to FIG. 4, the gassifier 10 has a fuel hopper 17 for receiving the material to be fired, for example sawdust which is gravity fed to a fire box 18 and thence to rotatable eccentric grates 19 which discharges the ash to an ash pit having a scraper 21 positioned to push ashes into a closable discharge hopper 22 through which the ashes may be discharged. The eccentric grates are mounted on a shaft 23 which may be motor driven or hand rotated by a crank 24 to cause the ashes to be discharged into the ash pit.

Figure 2:
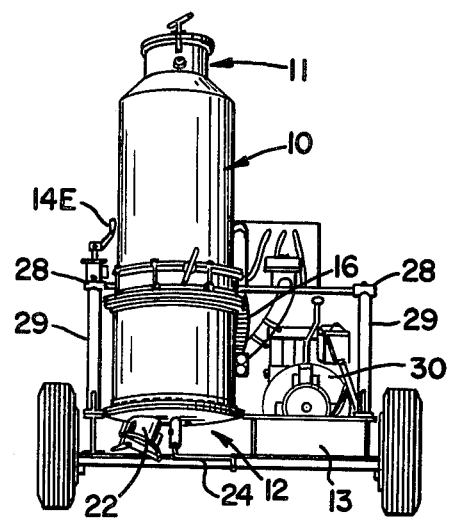
FIG. 2 is a rear elevational view of the apparatus of FIG. 1 showing an internal combustion engine being fueled thereby.

As shown in FIGS. 1 through 2 the platform support 13 for the gassifier 10 may be mobile and in fact may be a truck on which the gassifier is mounted. It may also be a static sled support movable from one site to another by crane, forklift truck, etc.

Figure 5:
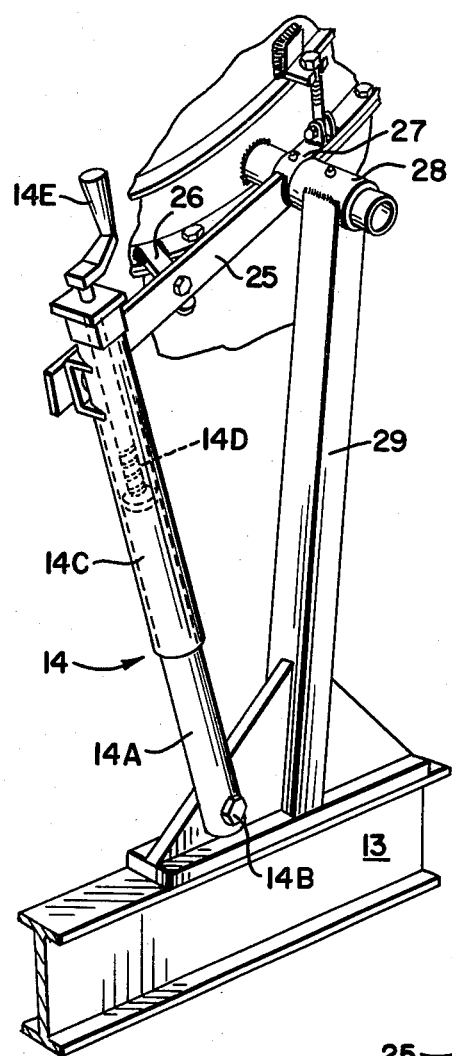
FIG. 5 is an enlarged perspective view of the manual hand crank mechanism for tilting the gassifier of my invention.

The adjustable support 14 has a tilt arm 25 connected to the gassifier 10 by arm 25 secured at one end to the gassifier 10 and journaled in a bearing 27, FIG. 5, to rock the gassifier about its vertical axis. The gassifier 10 is at the upper end of standard 29, one on each side of gassifier, see FIG. 2, which is secured to the platform support 13 as best seen in FIGS. 1, 3, and 5.

Figure 6:
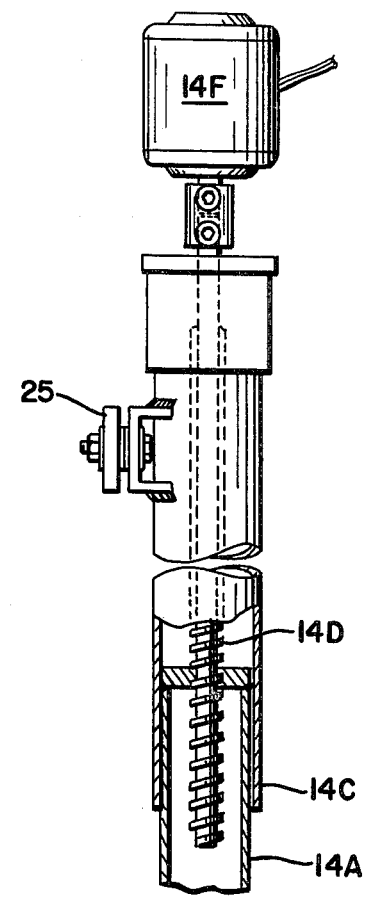
FIG. 6 is a fragmentary view of a modified form of a gassifier tilt mechanism employing an electric motor drive.
Figure 7:
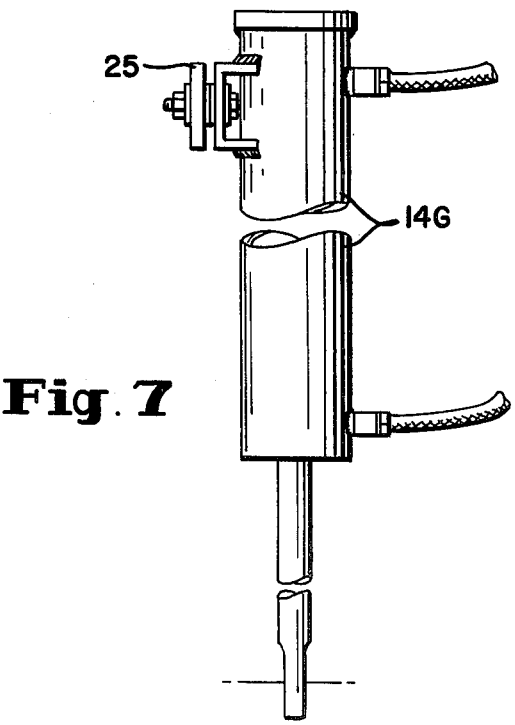
FIG. 7 is a fragmentary view of a further modified form of gassifier tilt mechanism employing a piston and cylinder drive mechanism.

The means connected to the adjustable support to incrementally tilt the gassifier 10 about its major axis is an elongatable arm 14 having a first portion 14A pivotally connected to the platform support 13 at 14B, and a second portion 14C having a screw drive 14D to cause the portions 14A and 14C to either elongate or contract depending upon the direction of rotation of the screw drive 14D. The screw drive in the embodiment shown in FIG. 5 is a hand crank 14E which may be manually rotated while as shown in FIG. 6 the screw drive 14D is controlled by a reversible electric motor 14F. FIG. 7 shows a cylinder and ram drive 14G for elongating and shortening the length of the tilt arm 14.

In all forms of length variation of arm 14 the resultant effect is to cause the tilt arm 25 and its connection 26 to the gassifier 10 to tilt the gassifier 10 for shifting its position from FIG. 1 to FIG. 3 and incrementally to any position therebetween which can vary the burn time of the fuel being fed to the fire box 18 from the fuel hopper 17 depending upon the compaction of the fuel mass and the desired fuel burn temperature to yield the desired gas to be attained or yielded from the burn of the fuel being fired. Time and temperature can be carried by tilting the gassifier 10 and different fuels may require different tilt angles to yield the desired gas for the purposes intended.

In Operation

Referring now to the embodiment of the invention shown in FIGS. 1 through 4 wherein the gassifier 10 is used to generate gas for fueling an internal combustion engine 30, the gassifier is placed in the attitude shown in FIG. 3 with its fuel charging opening 11 in the open condition and fuel is added to the fuel hopper 17 which feeds the fire box 18. The unit is then shifted from the position of FIG. 3 to that of FIG. 1 with the charging opening 11 closed. The gassifier is rocked about the bearings 27 by rotating the hand crank 14E which extends the adjustable support causing the arm portions 14A and 14C to elongate which rocks the tilt arm 25, thereby rocking the gassifier 10. The flexible hose 16 from the gassifier 10 is connected to the carburetor of the internal combustion engine and when the gas being yielded from the gassifier is of the right quality the internal combustion engine is then switched from gasoline fuel to the combustible produced by the gassifier. During the firing mode of the gassifier it may be necessary to increase or decrease the tilt angle of the gassifier 10. Such variation may be attained by rotating the hand crank 14E either clockwise or counter clockwise. When the burn has been completed the ash waste may be removed by opening the discharge hopper 22 and the unit can be moved by hand crank 14E to the position of FIG. 3 at which time the charging opening 11 is opened for recharging the gassifier with fuel to be burned.

What is claimed:

1. A biomass gas producer with tiltable gassifier comprising
   a gassifier for performing endothermic chemical reactions of solid material having combustible gas forming and liquifiable constituents having a top charging end,
   a mobile platform support means for said gassifier,
   pivotally mounted support means carried by said platform supporting said gassifier for rocking movement along its vertical axis for tilting said gassifier from a substantially vertical endothermic reaction mode to a low height inclined charging mode for introducing the material to be fired,
   a tiltable arm connected to said support means and said mobile platform, drive means connected between said tiltable arm and said mobile platform support to incrementally tilt the gassifer about its vertical support axis between a firing position and a loading waste discharge position,
   and flexible hose means connected to said gassifier for directing the burnable gas produced by said gassifier to operate a gas fired prime mover.

* * * * *